(12) United States Patent
Oikawa et al.

(10) Patent No.: US 8,411,411 B2
(45) Date of Patent: Apr. 2, 2013

(54) THIN-FILM CAPACITOR

(75) Inventors: Yasunobu Oikawa, Tokyo (JP); Yoshihiko Yano, Tokyo (JP)

(73) Assignee: TDK Corporation, Tokyo (JP)

( * ) Notice: Subject to any disclaimer, the term of this patent is extended or adjusted under 35 U.S.C. 154(b) by 197 days.

(21) Appl. No.: 12/876,611

(22) Filed: Sep. 7, 2010

(65) Prior Publication Data

US 2011/0075319 A1   Mar. 31, 2011

(30) Foreign Application Priority Data

Sep. 30, 2009   (JP) ................ P2009-228092

(51) Int. Cl.
*H01G 4/228* (2006.01)
*H01G 4/008* (2006.01)

(52) U.S. Cl. ............................. 361/306.1; 361/305

(58) Field of Classification Search ........ 361/303–305, 361/311, 307, 306.1
See application file for complete search history.

(56) References Cited

U.S. PATENT DOCUMENTS

| | | | | |
|---|---|---|---|---|
| 6,475,860 | B2 * | 11/2002 | Kwon et al. ............... | 438/253 |
| 6,897,503 | B2 * | 5/2005 | Otani et al. ................ | 257/295 |
| 6,963,483 | B2 * | 11/2005 | Chakravorty et al. ..... | 361/306.3 |
| 2004/0130849 | A1 * | 7/2004 | Kurihara et al. .......... | 361/311 |
| 2005/0056878 | A1 * | 3/2005 | Shioga et al. ............. | 257/300 |
| 2005/0146838 | A1 * | 7/2005 | Shioga et al. ............. | 361/306.3 |
| 2007/0176175 | A1 * | 8/2007 | Shioga et al. ............. | 257/40 |
| 2008/0068780 | A1 | 3/2008 | Shioga et al. | |

FOREIGN PATENT DOCUMENTS

JP   2008-078299   4/2008

* cited by examiner

*Primary Examiner* — Eric Thomas
(74) *Attorney, Agent, or Firm* — Oliff & Berridge, PLC

(57) ABSTRACT

To provide a thin-film capacitor capable of preventing the degradation of electrical characteristics caused by direct contact between an adhesion layer of a terminal electrode and a dielectric layer, to increase the reliability. The thin-film capacitor comprises: a dielectric layer deposited on a base electrode; an upper electrode layer deposited on the dielectric layer; a terminal electrode including an adhesion layer, a seed layer, and a plating layer; a resin layer for wiring provided between the upper electrode layer and the terminal electrode for isolating the upper electrode layer from the terminal electrode; and a wiring layer provided so as to extend through the resin layer for wiring in contact with the adhesion layer for electrically connecting the upper electrode layer and the terminal electrode, wherein a composition of the wiring layer differs from that of the adhesion layer of the terminal electrode, and wherein a reducing power of the wiring layer to the dielectric layer is smaller than that of the adhesion layer.

12 Claims, 4 Drawing Sheets

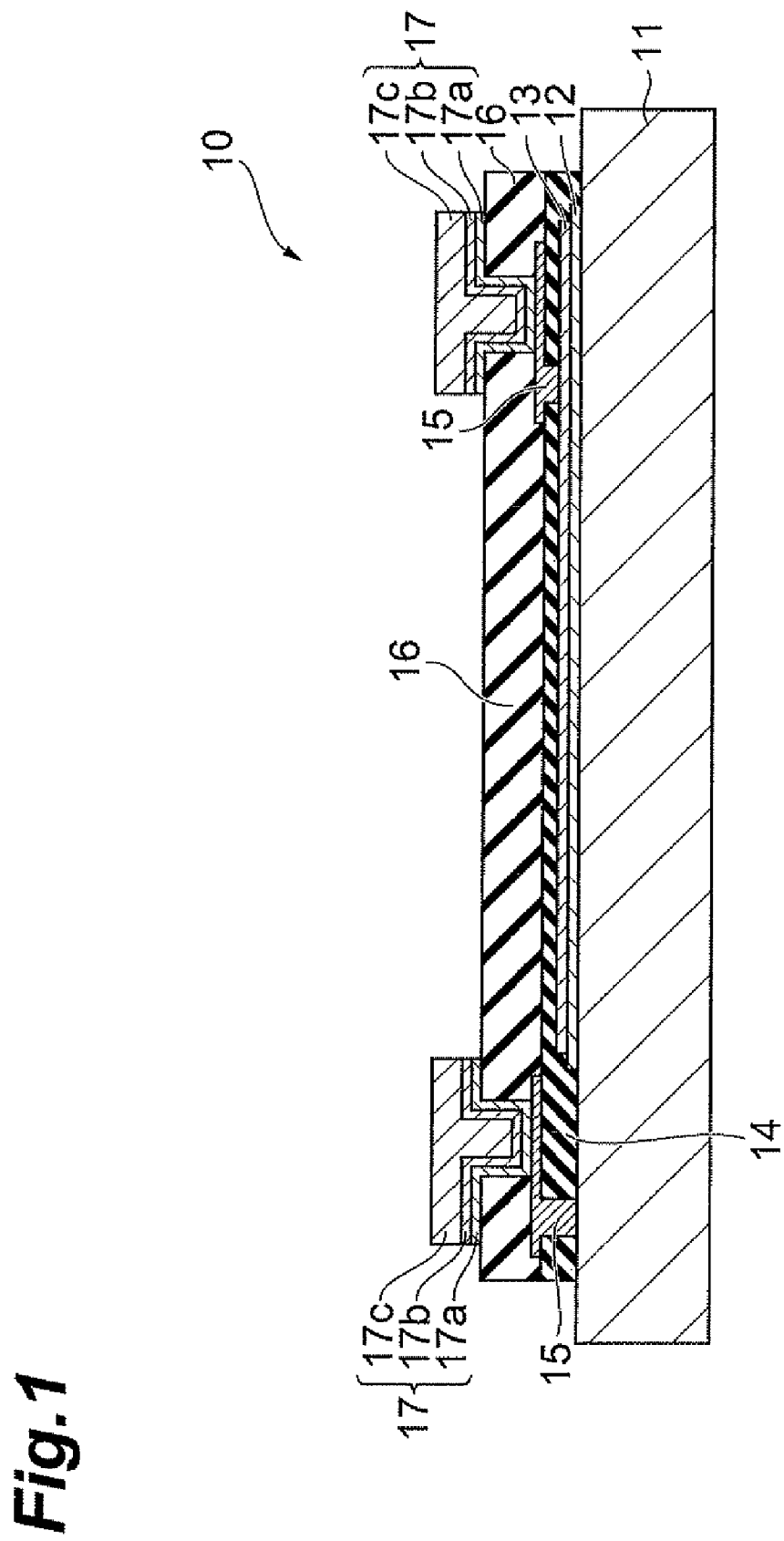

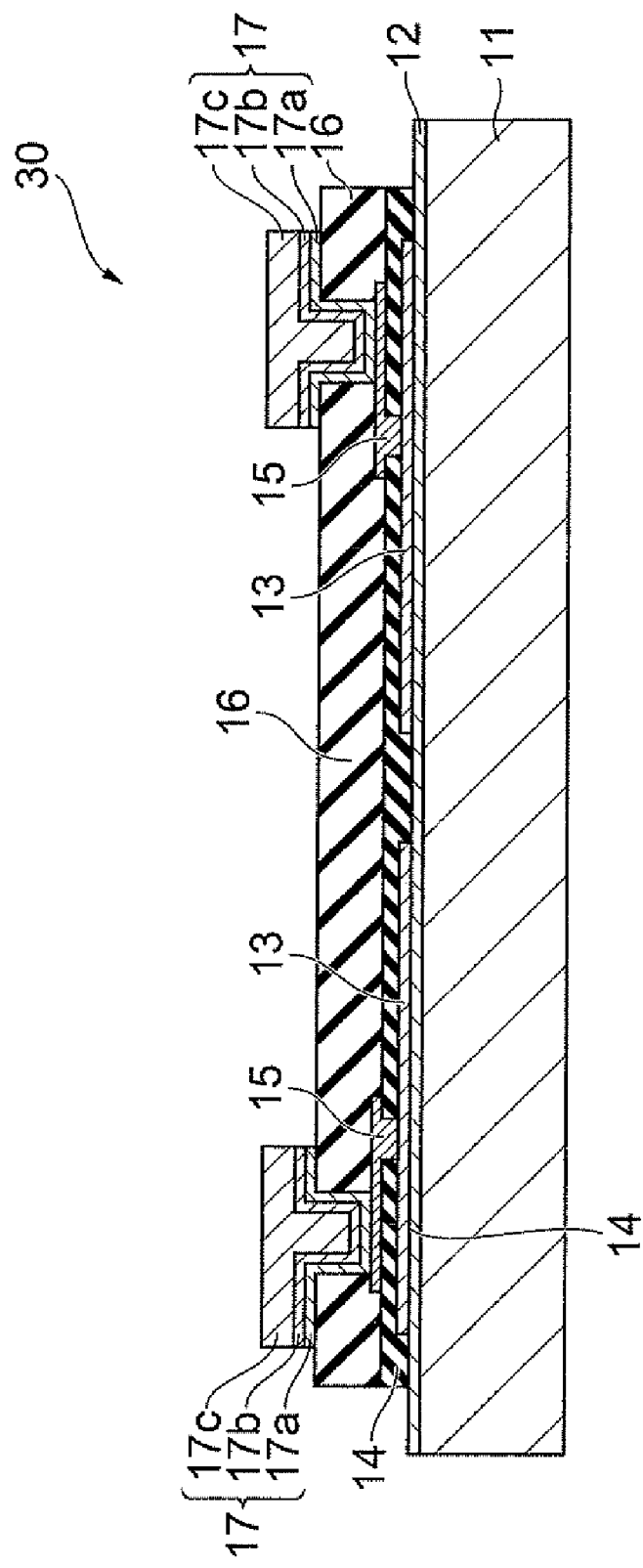

THIN-FILM CAPACITOR

BACKGROUND OF THE INVENTION

1. Field of the Invention

The present invention relates to thin-film capacitors.

2. Related Background of the Invention

In a thin-film capacitor having a lower electrode layer, a dielectric thin film, and an upper electrode layer deposited above a substrate and being further covered with a protective film made of polyimide or the like, the lower electrode layer and the upper electrode layer are electrically connected to a terminal electrode via an opening provided above the protective film, respectively (see Patent Document 1: Japanese Patent Application Laid-Open No. 2008-78299).

The opening is formed so as to expose each surface of the lower electrode layer and the upper electrode layer. Then, a seed layer is formed in the inner surface of this opening, and furthermore, a conductive material is filled with this seed layer as a feeding layer, thus forming a terminal electrode.

SUMMARY OF THE INVENTION

In the thin-film capacitor employing the configuration set forth in Patent Document 1, the terminal electrode usually has an adhesion layer formed beneath the seed layer for securing adhesion with the protective film. That is, the adhesion layer (for example, made of Ti, Cr, Ni—Cr, or the like) is in contact with the upper electrode layer. Here, if the upper electrode layer is too thin or if the upper electrode layer has a defect, the adhesion layer will directly contact the dielectric layer. Usually, an oxide is suitably used for the dielectric layer and a material having a large reducing power is used for the adhesion layer. Therefore, if the adhesion layer contacts the dielectric layer in this manner, then the reduction reaction of the dielectric layer may be promoted and the composition of the dielectric layer may deteriorate, and as a result, electrical characteristics of the dielectric layer may be degraded, and for example, a decrease in the withstand voltage, the insulation resistance value, or the like may occur. With a reduction in the thicknesses of electronic components in recent years, the upper electrode of the thin-film capacitor also tends to be thin, and thus such problems may be most likely to occur.

The present invention has been made in light of the above-described problems. It is an object of the present invention to provide a thin-film capacitor capable of preventing the degradation of electrical characteristics caused by direct contact between an adhesion layer of a terminal electrode and a dielectric layer to increase the reliability.

In order to solve the above-described problems, a thin-film capacitor according to the present invention comprises: a dielectric layer deposited on a base electrode; an upper electrode layer deposited on the dielectric layer; and a terminal electrode including an adhesion layer, a seed layer deposited on the adhesion layer, and a plating layer provided on the seed layer, the thin-film capacitor further comprising an insulating layer provided between the upper electrode layer and the terminal electrode for isolating the upper electrode layer from the terminal electrode, and a conductive layer provided so as to extend through the insulating layer in contact with the adhesion layer for electrically connecting the upper electrode layer and the terminal electrode, wherein a composition of the conductive layer differs from that of the adhesion layer of the terminal electrode, and wherein a reducing power of the conductive layer to the dielectric layer is smaller than that of the adhesion layer.

According to such a thin-film capacitor, the upper electrode layer and the terminal electrode are isolated from each other by the insulating layer, and the upper electrode layer and the terminal electrode are electrically connected to each other by the conductive layer provided so as to extend through the insulating layer. With this configuration, the upper electrode layer does not directly contact the terminal electrode, so that even if the upper electrode layer is too thin or has a defect, it is possible to prevent the adhesion layer of the terminal electrode from directly contacting the dielectric layer, and also possible to prevent a degradation of electrical characteristics caused by direct contact between the adhesion layer of the terminal electrode and the dielectric layer. Furthermore, the composition of the conductive layer which electrically connects the upper electrode layer and the terminal electrode differs from that of the adhesion layer of the terminal electrode, and moreover, the reducing power of the conductive layer to the dielectric layer is smaller than that of the adhesion layer. Therefore, even if the conductive layer directly contacts the dielectric layer due to a defect or the like of the upper electrode layer, the reduction reaction of the dielectric can be suppressed, and as a result, the degradation of electrical characteristics can be suppressed and the reliability of the thin-film capacitor can be improved. In addition, in forming the terminal electrode on the seed layer by plating or the like, a plating liquid component will not directly affect the dielectric layer due to a defect of the seed layer or the upper electrode layer and thus a highly reliable thin-film capacitor can be obtained.

Moreover, the content rate of a reducing metal in the conductive layer is preferably smaller than that of the adhesion layer. Thus, even if the conductive layer directly contacts the dielectric layer, the reduction reaction of the dielectric can be suitably suppressed, and the degradation of electrical characteristics can be suppressed and the reliability of the thin-film capacitor can be improved.

Moreover, the composition of the conductive layer is preferably the same as that of the upper electrode layer. Because the conductive layer will thus have the same composition as that of the upper electrode layer conventionally in direct contact with the dielectric layer, the reducing power of the conductive layer to the dielectric layer can be reduced and the reliability is improved. In addition, by setting the upper electrode layer and the conductive layer to have the same composition, the number of kinds of materials used in manufacturing the thin-film capacitor can be reduced and the manufacturing cost can be suppressed.

Moreover, the conductive layer preferably contains at least any one of Cu, Ni, Pt, Pd, Ir, Ru, Rh, Re, Os, Au, Ag, $IrO_2$, $RuO_2$, $SrRuO_3$, and $LaNiO_3$.

In addition, the oxide free energy of formation of the conductive layer is preferably −600 kJ/mol $O_2$ or more at room temperature.

In order to solve the above-described problems, a thin-film capacitor according to the present invention comprises: a dielectric layer deposited on a base electrode; an upper electrode layer deposited on the dielectric layer; and a terminal electrode including an adhesion layer, a seed layer deposited on the adhesion layer, and a plating layer provided on the seed layer, the thin-film capacitor further comprising an insulating layer provided between the upper electrode layer and the terminal electrode for isolating the upper electrode layer from the terminal electrode, and a conductive layer provided so as to extend through the insulating layer in contact with the adhesion layer for electrically connecting the upper electrode layer and the terminal electrode, wherein the adhesion layer of the terminal electrode contains at least any one of Ti, Cr, Ni—Cr, and Ta, and wherein the conductive layer contains at least any one of Cu, Ni, Pt, Pd, Ir, Ru, Rh, Re, Os, Au, Ag, $IrO_2$, $RuO_2$, $SrRuO_3$, and $LaNiO_3$.

According to such a thin-film capacitor, the upper electrode layer and the terminal electrode are isolated from each other by the insulating layer, and the upper electrode layer and the terminal electrode are electrically connected to each other by the conductive layer which is provided so as to extend through the insulating layer. This configuration does not allow the upper electrode layer to directly contact the terminal electrode, and therefore even if the upper electrode layer is too thin or has a defect, it is possible to prevent the adhesion layer of the terminal electrode from directly contacting the dielectric layer, and also possible to prevent the degradation of electrical characteristics caused by direct contact between the adhesion layer of the terminal electrode and the dielectric layer. Furthermore, the conductive layer electrically connecting the upper electrode layer and the terminal electrode contains at least any one of Cu, Ni, Pt, Pd, Ir, Ru, Rh, Re, Os, Au, Ag, $IrO_2$, $RuO_2$, $SrRuO_3$, and $LaNiO_3$, and the adhesion layer of the terminal electrode contains at least any one of Ti, Cr, Ni—Cr, and Ta. That is, for the conductive layer, a material having a small reducing power (i.e., a weak reduction action) to the dielectric as compared with that of the adhesion layer is used. With this configuration, even if the conductive layer directly contacts the dielectric layer due to a defect or the like of the upper electrode layer, the reduction reaction of the dielectric can be suppressed, and as a result, the degradation of electrical characteristics can be suppressed and the reliability of the thin-film capacitor can be improved.

The thin-film capacitor according to the present invention can prevent the degradation of electrical characteristics due to the direct contact between the adhesion layer of the terminal electrode and the dielectric layer and can increase the reliability.

BRIEF DESCRIPTION OF THE DRAWINGS

FIG. 1 is a schematic cross sectional view showing a structure of a thin-film capacitor according to one embodiment of the present invention.

FIG. 4 is a schematic cross sectional view showing a structure of a thin-film capacitor manufactured by the manufacturing method of FIGS. 3A-3E.

DESCRIPTION OF THE PREFERRED EMBODIMENTS

Figure 2A:
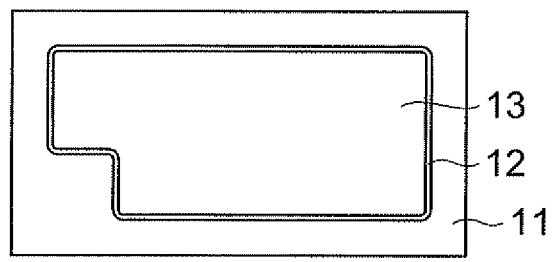
FIGS. 2A-2E illustrate a method for manufacturing the thin-film capacitor according to this embodiment.

Hereinafter, preferred embodiments of the present invention will be described. However, the present invention is not limited to the following embodiments. Note that the same or equivalent elements are given the same reference numeral to omit the duplicating description.

FIG. 1 is a schematic cross sectional view showing a structure of a thin-film capacitor 10 according to one embodiment of the present invention. As shown in FIG. 1, the thin-film capacitor 10 comprises: a base electrode 11; a dielectric layer 12 deposited on the base electrode 11; an upper electrode layer 13 deposited on the dielectric layer 12; a resin layer for wiring 14 (insulating layer) covering the dielectric layer 12 and the upper electrode layer 13; a pair of wiring layers (conductive layers) 15 which electrically connect the base electrode 11 and the upper electrode layer 13 to the later-described terminal electrode 17, respectively; a passivation layer 16 as a surface protective film; and a pair of terminal electrodes 17 electrically connecting the base electrode 11 and the upper electrode layer 13, respectively. In the terminal electrode 17, an adhesion layer 17a is formed in the undermost layer in order to secure adhesion with the passivation layer 16, a seed layer 17b is formed on the adhesion layer 17a, and a plating layer 17c is formed on the seed layer 17b.

Particularly in this embodiment, the resin layer for wiring 14 is provided between the upper electrode layer 13 and the terminal electrode 17 so as not to allow direct contact between the upper electrode layer 13 and the terminal electrode 17, and both are electrically connected to each other by a wiring layer 15 which is provided so as to extend through the resin layer for wiring 14. The wiring layer 15 is in contact with the upper electrode layer 13 and the adhesion layer 17a of the terminal electrode 17.

Note that, in FIG. 1, the resin layer for wiring 14 is also provided between the terminal electrode 17 and the base electrode 11, which are electrically connected to each other via the wiring layer 15. Alternatively, the terminal electrode 17 may directly contact the base electrode 11.

The base electrode 11 may comprise at least any one of Ni, Pt, Pd, Ir, Ru, Rh, Re, Os, Au, Ag, Cu, $IrO_2$, $RuO_2$, $SrRuO_3$, and $LaNiO_3$, for example. The film thickness of the base electrode 11 when there is a supporting substrate is preferably 50 to 2000 nm. Moreover, the base electrode 11 and the supporting substrate may comprise the same material. In such a case, for cost reduction, a base metal, such as inexpensive Ni, Cu, or Al, or an alloy of these metals as the principal component, or stainless steel, or Inconel is preferable, and in particular Ni foil is preferable. The total thickness when the base electrode 11 and the supporting substrate comprise the same material is preferably 5 to 500 µm. In this embodiment, the base electrode 11 comprises Ni foil, and has a function as a holding member to hold the dielectric layer 12, a function as the lower electrode, and a function as a base to form the dielectric layer 12. In this manner, the base electrode 11 according to this embodiment preferably serves as the substrate which comprises a metal foil or the like and also as the electrode. However, a substrate/electrode film structure including a substrate comprising Si, alumina, or the like, and an electrode comprising a metal film may be used as the base electrode 11.

A Perovskite type oxide, such as BT, i.e., barium titanate $BaTiO_3$, BST, i.e., barium titanate strontium $(BaSr)TiO_3$, ST, i.e., strontium titanate $SrTiO_3$, CZ, i.e., zirconic acid calcium $CaZrO_3$, $(BaSr)(TiZr)O_3$, or $BaTiZrO_3$, is suitably used for the dielectric layer 12. The dielectric layer 12 may contain one or more of these oxides. The film thickness of the dielectric layer 12 is preferably about 100 to 800 nm.

For cost reduction, the upper electrode layer 13 preferably comprises an inexpensive base metal material as the principal component, and in particular preferably comprises Cu as the principal component. Note that, the upper electrode layer may comprise at least any one of Ni, Pt, Pd, Ir, Ru, Rh, Re, Os, Au, Ag, Cu, $IrO_2$, $RuO_2$, $SrRuO_3$, and $LaNiO_3$, for example. The thickness of the upper electrode layer 13 is preferably about 100 to 800 nm.

The wiring layer 15 has a composition different from that of the adhesion layer 17a of the later-described terminal electrode 17, wherein the reducing power to the dielectric layer 12 is preferably smaller than that of the adhesion layer 17a, and more specifically, the content rate of the reducing metal is preferably smaller than that of the adhesion layer 17a. Specifically, the material used for the upper electrode layer 13 is preferably used here, and preferably contains at least any one of Cu, Ni, Pt, Pd, Ir, Ru, Rh, Re, Os, Au, Ag, IrO$_2$, RuO$_2$, SrRuO$_3$, and LaNiO$_3$. Moreover, this material more preferably has the same composition as that of the upper electrode layer 13.

Ti, Cr, Ni—Cr, Ta, or the like is preferably used for the adhesion layer 17a of the terminal electrode 17. The seed layer 17b is formed by electroplating with Cu or the like. Furthermore, as needed, a Ni layer, an Sn layer, or an Au layer is formed. For the plating layer 17c, a conductive material, e.g., Sn—Ag solder, is suitably used.

The material used for the adhesion layer 17a of the terminal electrode 17 is a reducing metal, such as Ti, Cr, Ni—Cr, or Ta, as described above. Here, the "reducing meal" as referred to in the present invention refers to a metal which exhibits a reducing action to the dielectric layer 12. The reducing action of these metals will degrade characteristics of the dielectric. That is, the phrase "large/small reducing power" as referred to in the present invention implies a strong/weak reducing action to the dielectric. Then, the strength of this reducing action can be determined by whether the standard free energy of formation ΔG to the oxide generation of a relevant metal at room temperature (e.g., about 15 to 30° C.) is less than −600 kJ/mol O$_2$ (a large reducing power) or not (a small reducing power).

If the adhesion layer 17a comprising such a reducing metal directly contacts the dielectric layer 12 for which a perovskite type oxide is suitably used, then the reduction reaction of the dielectric layer 12 may be promoted, the dielectric layer 12 may deteriorate, and the electrical characteristic may degrade. Then, in this embodiment, the resin layer for wiring 14 is provided between the upper electrode layer 13 and the terminal electrode 17 to isolate the both from each other, and furthermore the wiring layer 15 is provided to electrically connect the both to each other. That is, in this embodiment, to the upper electrode layer 13, the adhesion layer 17a of the terminal electrode 17 will not directly contact but the wiring layer 15 will contact instead. The wiring layer 15 comprises a material (Cu, Ni, Pt, Pd, Ir, Ru, Rh, Re, Os, Au, Ag, IrO$_2$, RuO$_2$, SrRuO$_3$, LaNiO$_3$, or the like) different from the reducing metal, as with the adhesion layer 17a. These materials have the compositions with a low content rate of a reducing metal as compared with the adhesion layer 17a, and have a small reducing power, i.e., a weak reducing action, to the dielectric as compared with the adhesion layer. For this reason, even if the wiring layer 15 directly contacts the dielectric layer 12 due to a defect or the like of the upper electrode layer 13, the reduction reaction of the dielectric layer 12 is suppressed as compared with the case where the adhesion layer 17a directly contacts the dielectric layer 12. As a result, the degradation of electrical characteristics can be suppressed and the reliability of the thin-film capacitor can be improved.

For the resin layer for wiring 14 and the passivation layer 16, an insulating resin, such as a polyimide resin, an epoxy resin, a phenol resin, a benzocyclobutene resin, a polyamide resin, a fluororesin, or an inorganic insulating material is used, and in particular, for example, a photosensitive polyimide resin is preferably used.

Next, with reference to FIGS. 2A-2E, a method for manufacturing the thin-film capacitor 10 is described.

First, as shown in FIG. 2(a), above the base electrode 11, the dielectric layer 12 is deposited and the upper electrode layer 13 is deposited with a mask, respectively, and a patterning of the dielectric layer 12 and the upper electrode layer 13 is performed respectively by photo-etching, for example.

Figure 2B:
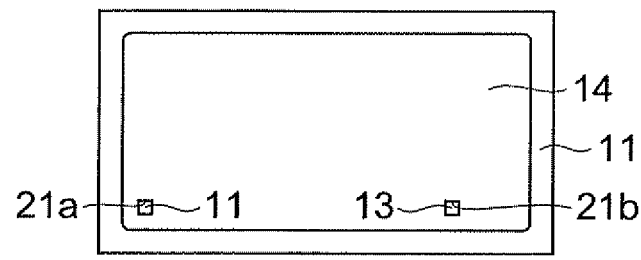

Next, as shown in FIG. 2(b), a pattern of the resin layer for wiring 14 is formed using a photosensitive polyimide resin, for example. At this time, a pair of openings 21a, 21b is provided within the resin layer for wiring 14 so as to expose the surfaces of the base electrode 11 and the upper electrode layer 13.

Figure 2C:
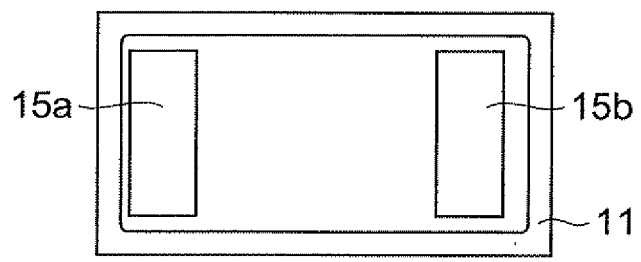

Furthermore, as shown in FIG. 2(c), the wiring layer 15 is deposited on the resin layer for wiring 14, and is patterned by photo-etching so as to have two regions 15a, 15b which cover the openings 21a, 21b, respectively.

Figure 2D:
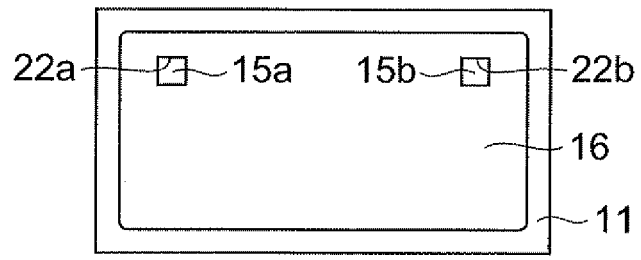

Next, as shown in FIG. 2(d), a pattern of the passivation layer 16 is formed using a photosensitive polyimide resin, for example. At this time, a pair of openings 22a, 22b is provided within the passivation layer 16 so as to expose two regions 15a, 15b of the wiring layer 15.

Figure 2E:
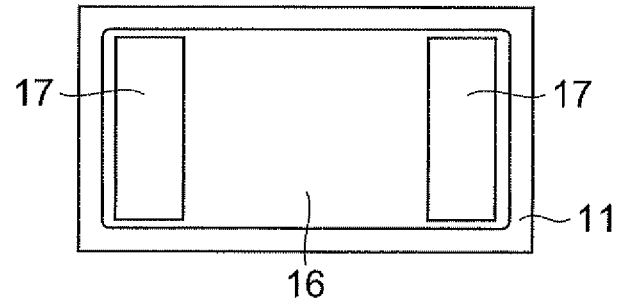

Then, as shown in FIG. 2(e), the adhesion layer 17a of the terminal electrode 17 is deposited so as to cover the openings 22a, 22b provided within the passivation layer 16, and the seed layer 17b is deposited on the adhesion layer 17a, and furthermore, the plating layer 17c is formed, for example, by electroplating to form the terminal electrode 17.

In addition, the thin-film capacitor 10 according to this embodiment can be prepared also with a manufacturing method shown in FIG. 3. In the manufacturing method shown in FIG. 3, two thin-film capacitors can be formed with one-time manufacturing process. Note that, although FIG. 3 illustrates the process through which two thin-film capacitors are formed, two or more thin-film capacitors can be simultaneously formed with the same manufacturing method.

Figure 3A:
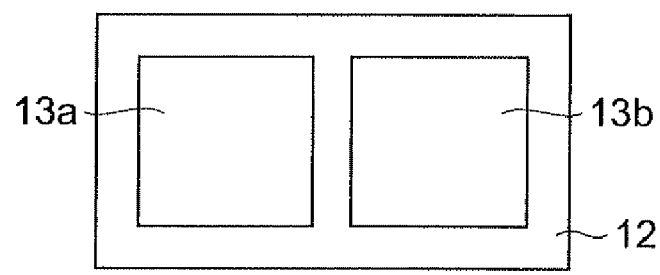
FIGS. 3A-3E illustrate a method for manufacturing a thin-film capacitor according to a modification of this embodiment.

First, as shown in FIG. 3(a), the dielectric layer 12 is deposited on the base electrode 11. The upper electrode layer 13 is deposited on the dielectric layer 12, and is patterned so as to have two regions 13a, 13b.

Figure 3B:
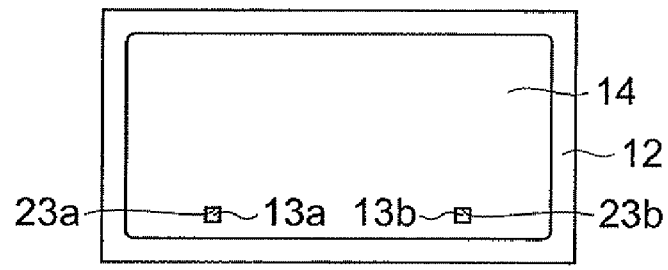

Next, as shown in FIG. 3(b), a pattern of the resin layer for wiring 14 is formed using a photosensitive polyimide resin. for example. At this time, a pair of openings 23a, 23b is provided within above the resin layer for wiring 14 so as to expose two upper electrode layers 13a, 13b.

Figure 3C:
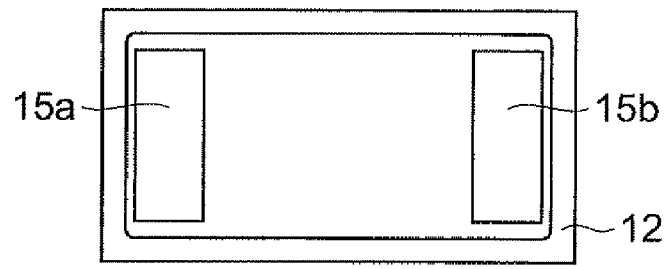

Furthermore, as shown in FIG. 3(c), the wiring layer 15 is deposited on the resin layer for wiring 14, and is patterned by photo-etching so as to have two regions 15a, 15b which cover the openings 23a, 23b, respectively.

Figure 3D:
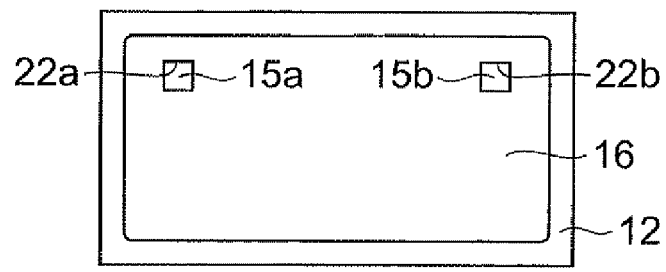

Next, as shown in FIG. 3(d), a pattern of the passivation layer 16 is formed using a photosensitive polyimide resin, for example. At this time, a pair of openings 22a, 22b is provided within the passivation layer 16 so as to expose two regions 15a, 15b of the wiring layer 15.

Figure 3E:
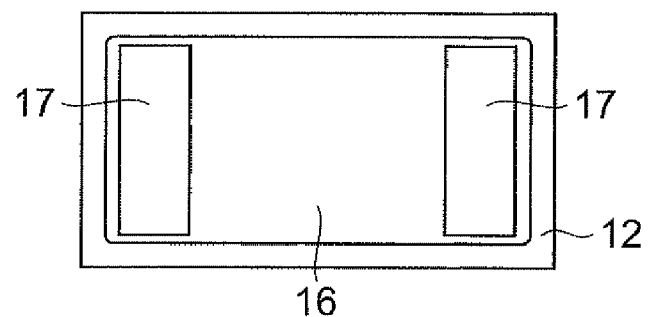

Then, as shown in FIG. 3(e), the adhesion layer 17a of the terminal electrode 17 is deposited so as to cover the openings 22a, 22b provided within the passivation layer 16, and the seed layer 17b is deposited on the adhesion layer 17a, and furthermore, the plating layer 17c is formed, for example, by electroplating to form the terminal electrode 17.

The structure of a thin-film capacitor 30 manufactured by the manufacturing method shown in FIG. 3 is shown in FIG. 4. As shown in FIG. 4, the thin-film capacitor 30 has a structure to form two capacitors therein. Note that the composition and property of each constituent element of the thin-film capacitor 30 shown in FIG. 4 are the same as those shown and described in FIG. 1.

In this manner, in the thin-film capacitors 10, 30 according to this embodiment, the upper electrode layer 13 and the terminal electrode 17 are isolated from each other by the resin layer for wiring 14, and the upper electrode layer 13 and the terminal electrode 17 are electrically connected to each other by the wiring layer 15 which is provided so as to extend through the resin layer for wiring 14. This structure does not allow the upper electrode layer 13 to directly contact the terminal electrode 17, and therefore even if the upper electrode layer 13 is too thin or has a defect, it is possible to prevent the adhesion layer 17a of the terminal electrode 17 from directly contacting the dielectric layer 12, and also possible to prevent the degradation of electrical characteristics caused by the direct contact between the adhesion layer 17a of the terminal electrode 17 and the dielectric layer 12. Furthermore, the composition of the wiring layer 15 which electrically connects the upper electrode layer 13 and the terminal electrode 17 differs from that of the adhesion layer 17a of the terminal electrode 17, and moreover, the reducing power of the wiring layer 15 to the dielectric is smaller than that of the adhesion layer 17a. Therefore, even if the wiring layer 15 directly contacts the dielectric layer 12 due to a defect or the like of the upper electrode layer 13, the reduction reaction of the dielectric can be suppressed, and as a result, the degradation of electrical characteristics can be suppressed and the reliability of the thin-film capacitors 10, 30 can be improved. In addition, in forming the terminal electrode above the seed layer 17b by plating or the like, a defect of the seed layer 17b or the upper electrode layer 13 will not cause a plating liquid component to directly affect the dielectric layer 12, and thus a highly reliable thin-film capacitor can be obtained.

Moreover, since the content rate of a reducing metal in the wiring layer 15 is smaller than that in the adhesion layer 17a, even if the wiring layer 15 directly contacts the dielectric layer 12, the reduction reaction of the dielectric can be suitably suppressed, and thus the degradation of electrical characteristics can be suppressed and the reliability of the thin-film capacitor can be improved.

Moreover, particularly preferably, the composition of the wiring layer 15 is the same as that of the upper electrode layer 13. In this case, the wiring layer 15 will have the same composition as that of the upper electrode layer 13 conventionally in direct contact with the dielectric layer 12, and therefore the reducing power of the wiring layer 15 to the dielectric layer 12 can be reduced and the reliability is improved. Moreover, by setting the upper electrode layer 13 and the wiring layer 15 to have the same composition, the number of kinds of materials used in manufacturing the thin-film capacitors 10, 30 can be reduced and the manufacturing cost can be suppressed.

EXAMPLES

Hereinafter, the present invention is described more specifically using an example. However, the present invention is not limited to the following example.

Example

The dielectric layer (BaTiO$_3$-based) 12 and the upper electrode layer (Cu) 13 were sequentially deposited above the base electrode 11 made of Ni foil, and thereafter the upper electrode layer 13 was processed by photo-etching, and furthermore the dielectric layer 12 was processed by photo-etching so as to be able to electrically connect to the Ni foil 11 serving as the lower electrode. At this time, the thickness of the dielectric layer 12 and the shape of the electrode were set so that the electrostatic capacitance may be about 12 nF.

Next, a pattern of the resin layer for wiring 14 was formed using a photosensitive polyimide resin. Next, a metal foil (Cu) serving as the wiring layer 15 was deposited, and was patterned by photo-etching. Furthermore, a pattern of the passivation layer 16 was formed using a photosensitive polyimide resin. The Cu seed layer 17b was deposited with Ti as the adhesion layer 17a. Furthermore, the terminal portion was Cu-plated and the unwanted adhesion layer 17a and seed layer 17b were removed to form the terminal electrode 17.

One thousand thin-film capacitors were prepared using such a technique. Then, these thin-film capacitors were subjected to a capacitance measurement (the capacitors of 12 nF±15% in capacitance were determined as non-defective products), a withstand voltage test (30 Vdc was applied, and the capacitors of 0.1 Mohm or less in resistance were determined as defective products), and an insulation resistance test (16 Vdc was applied, the capacitors of 1 Mohm or less in resistance were determined as defective products), and a total number of the respective defective products was calculated.

Furthermore, one hundred thin-film capacitors were extracted out of one thousand thin-film capacitors used in the above-described tests, a high temperature load test at a temperature of 125° C. and an applied voltage of 16 Vdc for 240 hours was performed, and the defective products due to the degradation of the insulation resistance after the test were counted (16 Vdc was applied, and the capacitors of 1 Mohm or less in resistance were determined as the defective products).

Comparative Example

As with the example, the dielectric layer 12 and the upper electrode layer 13 were deposited above the base electrode 11 made of Ni foil, and were sequentially processed by photo-etching. On top thereof, a pattern of the passivation layer 16 was formed without forming the resin layer for wiring 14 and the wiring layer 15. Then, as with the example, the adhesion layer 17a and the seed layer 17b were formed, and the terminal electrode 17 was processed, thereby preparing one thousand thin-film capacitors. Then, as with the example, the capacitance measurement, the withstand voltage test, the insulation resistance test, and the high temperature load test were performed, and a total number of the respective defective products was calculated.

With regard to the above-described example and comparative example, the results are shown in Table 1.

TABLE 1

| | Example | | Comparative Example | |
| --- | --- | --- | --- | --- |
| | Number of defective products | Defective rate (%) | Number of defective products | Defective rate (%) |
| Capacitance measurement | 4 | 0.4 | 3 | 0.3 |
| Withstand voltage test | 1 | 0.1 | 32 | 3.2 |
| Insulation resistance test | 3 | 0.3 | 22 | 2.2 |
| High temperature load test | 0 | 0.0 | 7 | 7.0 |

As shown in Table 1, it was confirmed in the example, wherein the resin layer for wiring 14 was provided between the upper electrode layer 13 and the terminal electrode 17 and the wiring layer 15 which electrically connects the upper electrode layer 13 and the terminal electrode 17 was formed, that the defective rate of each test can be suppressed to as low as 0.4% at the maximum. On the other hand, it was confirmed in the comparative example without the resin layer for wiring 14 and the wiring layer 15 that the defective rate in the withstand voltage test, the insulation resistance test, and the high temperature load test, respectively, significantly increases as compared with the example. Note that, in the capacitance measurement test, the defective rate of the example is the same as that of the comparative example.

That is, it was confirmed that the thin-film capacitor of the example can suppress the occurrence of a defective product caused by the capacitance measurement, the withstand voltage test, the insulation resistance test, and the high temperature load test as compared with the comparative example, and suppress the degradation of electrical characteristics, and improve the reliability of the thin-film capacitor 10.

Next, the effect of characteristic degradation of the dielectric layer 12 due to the materials of the upper electrode layer 13 and wiring layer 15 is described.

It is known that dielectric oxides, such as BT and BST, can be easily rendered electrically conductive by a heat treatment in a reducing atmosphere. Then, in order to select an electrode material which does not exhibit such a reducing power that degrades the characteristics of such dielectrics, a thin film of BT or BST was deposited in a thickness of 200 to 300 nm on a substrate having a Pt lower electrode formed in a Si wafer, and furthermore various kinds of electrode materials (Ag, Au, Ni, Ti, Cu, Al, Cr, Ni—Cr, Ta, and Pt) were formed as the upper electrode and thereafter a heat treatment at 400 to 700° C. was performed. Thereafter, the electric characteristics were measured, and it was determined from the characteristics, such as the leakage current and the withstand voltage, whether the electrode material is usable or unusable. That is, if the electrical characteristics, such as the leakage current and the withstand voltage after performing the above-described heat treatment did not degrade by a predetermined value or more from those prior to the heat treatment, then it was determined that this material is usable as the electrode material (i.e., the materials of the upper electrode layer 13 and the wiring layer 15).

Regarding the above-described determination results, the determination results when BT is used as the dielectric material for each electrode material and the determination results when BST is used as the dielectric materials for each electrode material are shown. Note that, in the Table 2, when it was determined as usable as the electrode material (i.e., the materials of the upper electrode layer 13 and the wiring layer 15), a "blank circle" is marked, and when determined as unusable, a "x" is marked.

TABLE 2

| Upper electrode material | BT dielectric | BST dielectric |
|---|---|---|
| Ag | ○ | ○ |
| Au | ○ | ○ |
| Ni | ○ | ○ |
| Ti | x | x |
| Cu | ○ | ○ |
| Al | x | x |
| Cr | x | x |
| Ni—Cr | x | x |
| Ta | x | x |
| Pt | ○ | ○ |

As shown in Table 2, when Ag, Au, Ni, Cu, and Pt were used as the electrode material, the degradation of electrical characteristics of the dielectric did not occur after the heat treatment, and therefore these materials were determined usable as the electrode material (the materials of the upper electrode layer 13 and the wiring layer 15). On the other hand, when Ti, Al, Cr, Ni—Cr, and Ta were used as the electrode material, the degradation of electrical characteristics of the dielectric occurred after the heat treatment, and therefore these materials were determined unusable as the electrode material. Then, with regard to the materials Ag, Au, Ni, Cu, and Pt which were determined usable as the electrode material, the free energy of formation of the oxide is −600 kJ/mol $O_2$ or more at room temperature, and on the other hand, with regard to the materials Ti, Al, Cr, Ni—Cr, and Ta which were determined unusable as the electrode material, the free energy of formation of the oxide is less than −600 kJ/mol $O_2$ at room temperature.

This result confirmed that a metal material wherein the free energy of formation of an oxide of the metal is −600 kJ/mol $O_2$ or more at room temperature would generally not degrade the characteristics of the dielectric. That is, in the present invention, Ag, Au, Ni, Cu, Pt, and the like used as the upper electrode layer 13 and the wiring layer 15 are metals wherein the free energy of formation of an oxide thereof is −600 kJ/mol $O_2$ or more, and therefore can be considered not to degrade the characteristics of the dielectric. Similarly, also with regard to materials other than those described above, i.e., Pd, Ir, Ru, Rh, Re, Os, $IrO_2$, $RuO_2$, $SrRuO_3$, and $LaNiO_3$, used as the upper electrode layer 13 and the wiring layer 15, the free energy of formation of an oxide thereof is −600 kJ/mol $O_2$ or more, and therefore these materials can be considered not to degrade the characteristics of the dielectrics.

On the other hand, it was confirmed that a metal material wherein the free energy of formation of an oxide of the metal is less than −600 kJ/mol $O_2$ at room temperature would have such a reducing power that degrades the characteristic of the dielectric. That is, in the present invention, Ti, Cr, Ta, Ni—Cr, and the like used as the adhesion layer 17a are metals wherein the free energy of formation of an oxide thereof is less than −600 kJ/mol $O_2$, and therefore can be considered to have such a reducing power that degrades the characteristics of the dielectric.

What is claimed is:

1. A thin-film capacitor comprising:
   a dielectric layer deposited on a base electrode;
   an upper electrode layer deposited on the dielectric layer;
   a pair of terminal electrodes each including an adhesion layer, a seed layer deposited on the adhesion layer, and a plating layer provided on the seed layer;
   an insulating layer provided between the upper electrode layer and the terminal electrodes for isolating the upper electrode layer from the terminal electrodes;
   a first conductive layer that extends between the upper electrode layer and a first terminal electrode of the pair of terminal electrodes and extends through the insulating layer so as to be in contact with the adhesion layer of the first terminal electrode for electrically connecting the upper electrode layer and the first terminal electrode, and
   a second conductive layer that extends between the base electrode and a second terminal electrode of the pair of terminal electrodes and extends through the insulating layer so as to be in contact with the adhesion layer of the second terminal electrode for electrically connecting the base electrode and the second terminal electrode, wherein
   a composition of the conductive layers differs from that of the adhesion layers of the terminal electrodes, and
   a reducing power of the conductive layers to the dielectric layer is smaller than that of the adhesion layers.

2. The thin-film capacitor according to claim 1, wherein a content rate of a reducing metal in the conductive layers is smaller than that in the adhesion layers.

3. The thin-film capacitor according to claim 1, wherein a composition of the conductive layers is the same as that of the upper electrode layer.

4. The thin-film capacitor according to claim 1, wherein at least one of the first and second conductive layers contains at least one of Cu, Ni, Pt, Pd, Ir, Ru, Rh, Re, Os, Au, Ag, IrO2, RuO2, SrRuO3 and LaNiO3.

5. The thin-film capacitor according to claim 1, wherein an oxide free energy of formation of the conductive layers is −600 kJ/molO2 or more at room temperature.

6. The thin-film capacitor according to claim 1, wherein:
the upper electrode is separated from the first terminal electrode by, in the order from the upper electrode to the first terminal electrode, the insulating layer and the first conductive layer, the first conductive layer extending through a first via in the insulating layer for electrically connecting the upper electrode layer and the first terminal electrode; and
the base electrode is separated from the second terminal electrode by, in the order from the base electrode to the second terminal electrode, the insulating layer and the second conductive layer, the second conductive layer extending through a second via in the insulating layer for electrically connecting the base electrode and the second terminal electrode.

7. The thin-film capacitor according to claim 1, wherein:
the first and second conductive layers are made of a same material.

8. The thin-film capacitor according to claim 1, wherein:
the first conductive layer is in direct contact with the adhesion layer of the first terminal electrode and in direct contact with the upper electrode layer; and
the second conductive layer is in direct contact with the adhesion layer of the second terminal electrode and in direct contact with the base electrode.

9. A thin-film capacitor comprising:
a dielectric layer deposited on a base electrode;
an upper electrode layer deposited on the dielectric layer;
a pair of terminal electrodes each including an adhesion layer, a seed layer deposited on the adhesion layer, and a plating layer provided on the seed layer;
an insulating layer provided between the upper electrode layer and the terminal electrodes for isolating the upper electrode layer from the terminal electrodes;
a first conductive layer that extends between the upper electrode layer and a first terminal electrode of the pair of terminal electrodes and extends through the insulating layer so as to be in contact with the adhesion layer of the first terminal electrode for electrically connecting the upper electrode layer and the first terminal electrode, and
a second conductive layer that extends between the base electrode and a second terminal electrode of the pair of terminal electrodes and extends through the insulating layer so as to be in contact with the adhesion layer of the second terminal electrode for electrically connecting the base electrode and the second terminal electrode,
wherein the adhesion layer of at least one of the first and second terminal electrodes contains at least one of Ti, Cr, Ni—Cr and Ta, and
wherein at least one of the first and second conductive layers contains at least one of Cu, Ni, Pt, Pd, Ir, Ru, Rh, Re, Os, Au, Ag, IrO2, RuO2, SrRuO3 and LaNiO3.

10. The thin-film capacitor according to claim 9, wherein:
the upper electrode is separated from the first terminal electrode by, in the order from the upper electrode to the first terminal electrode, the insulating layer and the first conductive layer, the first conductive layer extending through a first via in the insulating layer for electrically connecting the upper electrode layer and the first terminal electrode; and
the base electrode is separated from the second terminal electrode by, in the order from the base electrode to the second terminal electrode, the insulating layer and the second conductive layer, the second conductive layer extending through a second via in the insulating layer for electrically connecting the base electrode and the second terminal electrode.

11. The thin-film capacitor according to claim 9, wherein:
the first and second conductive layers are made of a same material.

12. The thin-film capacitor according to claim 9, wherein:
the first conductive layer is in direct contact with the adhesion layer of the first terminal electrode and in direct contact with the upper electrode layer; and
the second conductive layer is in direct contact with the adhesion layer of the second terminal electrode and in direct contact with the base electrode.

* * * * *